(12) United States Patent
Puschmann-Frenken (10) Patent No.: US 8,061,243 B2
(45) Date of Patent: Nov. 22, 2011

(54) CUTTING ARRANGEMENT FOR CUTTING A WORKPIECE HAVING A TOOL HOLDER WHICH HOLDS A PLURALITY OF CUTTING TOOLS THEREIN

(75) Inventor: Jürgen Puschmann-Frenken, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 410 days.

(21) Appl. No.: 12/434,275

(22) Filed: May 1, 2009

(65) Prior Publication Data

US 2010/0111622 A1    May 6, 2010

Related U.S. Application Data

(63) Continuation-in-part of application No. PCT/EP2007/008346, filed on Sep. 26, 2007.

(51) Int. Cl.
*B26D 1/00* (2006.01)
*B23B 29/04* (2006.01)

(52) U.S. Cl. .......................................... 82/160; 407/104

(58) Field of Classification Search ................ 82/157, 82/158, 160; 407/70, 73, 77, 83, 104; 29/35.5, 29/39, 48.5 A
See application file for complete search history.

(56) References Cited

U.S. PATENT DOCUMENTS

| | | | | |
|---|---|---|---|---|
| 4,964,763 | A | * | 10/1990 | Kieninger ........................ 407/40 |
| 5,259,707 | A | * | 11/1993 | Keller ............................. 408/233 |
| 5,873,682 | A | * | 2/1999 | Tripsa ............................ 407/101 |
| 5,913,643 | A | * | 6/1999 | Fowler et al. ................... 407/36 |
| 6,543,318 | B1 | | 4/2003 | Erickson |
| 7,311,478 | B2 | * | 12/2007 | Erickson et al. ................. 407/48 |
| 7,462,005 | B2 | * | 12/2008 | Frejd et al. ..................... 408/180 |
| 2006/0104728 | A1 | | 5/2006 | Erickson et al. |

FOREIGN PATENT DOCUMENTS

| | | |
|---|---|---|
| DD | 867 38 | 8/1970 |
| DE | 28 02131 | 7/1979 |
| DE | 86 33 959 | 4/1988 |
| DE | 42 21 735 | 3/1993 |
| DE | 600 23 191 | 7/2006 |

OTHER PUBLICATIONS

International Search Report PCT/EP2007/008346 and English translation thereof, Jun. 3, 2008.
International Preliminary Report on Patentability PCT/EP2007/008346 and English translation thereof, Jun. 3, 2008.

* cited by examiner

*Primary Examiner* — Will Fridie, Jr.
(74) *Attorney, Agent, or Firm* — Larry R. Meenan

(57) ABSTRACT

A tool holder having a number of tool receptacles which are provided in a parent body and into which a respective cutting tool can be inserted with a fastening shank and can be clamped in the tool receptacle via a clamping device. The clamping device in this case comprises a clamping bolt which extends laterally through a bore in the parent body up to the tool receptacle and has at its outer end a bolt head which can be actuated via a setting tool. The bolt head is in this case locked by a locking element which is attached to the parent body in the region of the bore and which forms a stop for the bolt head.

20 Claims, 6 Drawing Sheets

CUTTING ARRANGEMENT FOR CUTTING A WORKPIECE HAVING A TOOL HOLDER WHICH HOLDS A PLURALITY OF CUTTING TOOLS THEREIN

CONTINUING APPLICATION DATA

This application is a Continuation-In-Part application of International Patent Application No. PCT/EP2007/008346, filed on Sep. 26, 2007, which claims priority from Federal Republic of Germany Patent Application No. 10 2006 052 051.3, filed on Nov. 4, 2006. International Patent Application No. PCT/EP2007/008346 was pending as of the filing date of this application. The United States was an elected state in International Patent Application No. PCT/EP2007/008346.

BACKGROUND

1. Technical Field

The present application relates to a cutting arrangement for cutting a workpiece having a tool holder which holds a plurality of cutting tools therein. The present application further relates to a tool holder for accommodating cutting tools.

2. Background Information

Background information is for informational purposes only and does not necessarily admit that subsequently mentioned information and publications are prior art.

During the machining of workpieces, tool holders, among other things, into which cutting tools are interchangeably inserted are used. In this case, the cutting tools have a fastening shank with which they can be inserted into a tool receptacle of the tool holder and clamped therein. The cutting tool has in this case a blade or a cutting element which can be interchangeably fastened to the cutting tool.

In order to keep the downtimes during a tool change as short as possible, problem-free and simple interchangeability of the cutting tool is important.

Some quick-change tooling systems include a cutting tool which can be interchangeably fastened in a tool holder designated as a tool carrier part. In this case, the cutting tool is inserted into a tool receptacle. A bore, into which a clamping bolt is inserted, passes through the tool holder transversely to the longitudinal direction of the tool receptacle. Said clamping bolt is screwed with its one end into a clamping nut. The clamping nut is in this case inserted into the bore from the opposite side. The clamping bolt and the clamping nut are essentially freely movable inside the bore. During the clamping, a bolt head of the clamping bolt and the clamping nut are drawn toward one another and thereby hold the fastening shank of the cutting tool in the tool receptacle.

A further measure in order to reduce the downtime comprises providing a plurality of tool receptacles on a tool holder. During the workpiece machining, it is therefore possible, for example by rotating the tool holder, to bring different types of cutting tools for different machining operations into a machining position. A worn cutting tool can also be rotated out of the machining position and an unused cutting tool can be rotated into the machining position. In such a multiple tool holder, however, there is the problem that the tool holder inevitably increases in volume. This increased space requirement may lead to disadvantages in restricted space conditions.

OBJECT OR OBJECTS

An object of the present application is to disclose a compact tool holder which is designed for accommodating a plurality of cutting tools and makes possible quick and simple exchange of the respective cutting tool.

SUMMARY

This object is achieved according to the present application by a tool holder having a number of tool receptacles which are provided in a parent body and into which a respective cutting tool can be inserted with a fastening shank and can be clamped in the tool receptacle via a clamping device. The clamping device in this case comprises a clamping bolt which extends laterally through a bore in the parent body up to the tool receptacle and has at its outer end a bolt head which can be actuated via a setting tool. The bolt head is in this case locked by a locking element which is attached to the parent body in the region of the bore and which forms a stop for the bolt head.

In one possible embodiment of the present application, the clamping bolt is locked by the additional locking element to prevent, restrict, and/or minimize it from falling out and that therefore the clamping device can be inserted into the parent body merely from one side. On the whole, therefore, a captive locking means is formed by the locking element. A throughbore and accessibility of the bore on both sides is therefore not necessary or may not be desired and is also not provided. Due to this configuration, therefore, the tool receptacles can be integrated in the parent body without any problems, such that they are arranged next to one another in said parent body. It is therefore not necessary or may not be desired for the tool receptacles to be detachably connected to the parent body as separate elements. For this leads to an increased space requirement on account of the requisite or desired additional fastening elements.

In contrast, in the tool holder described here, the parent body is in one possible embodiment of one piece design, i.e. the tool receptacles are designed as bores in a uniform block forming the parent body. In principle, it is possible to provide a plurality of tool carrying elements, each of the individual tool carrying elements in one possible embodiment having a tool receptacle which is provided with the clamping device. In this embodiment variant, the individual tool carrying elements form, if need be or if desired together with a supporting body for the individual tool carrying elements, the parent body of the tool holder.

One possible embodiment of the present application, a compact configuration is achieved in a tool holder having two or more tool receptacles. In principle, merely a single tool receptacle may also be provided.

The tool holders are in one possible embodiment arranged at the end face or radially at the circumferential side.

The cutting tool comprises, for example, a blade carrier, such as, for example, a cassette, to which a cutting element, for example, an indexable insert, is interchangeably fastened. The cutting tool therefore has at its rear end the clamping or fastening shank with which it can be inserted into the tool receptacle. The cutting element or a blade is provided at the opposite end. The cutting tool may in principle also be monolithic, i.e. the blade is not interchangeably fastened to the cutting tool but rather is an integral and fixedly connected component of the cutting tool.

According to one possible embodiment, the locking element is in this case designed as an insert. The locking element is therefore a separate component which is simple to produce and in addition can also be connected to the parent body in a simple and easy-to-fit manner.

Provision is in one possible embodiment made here for the locking element to be detachably fastened to the parent body.

This permits problem-free and simple exchange of the clamping bolt, provided this becomes necessary and/or desired. For example, a clamping connection or a form-fitting connection, for example like a bayonet catch, is provided for the detachable fastening. The locking element is in one possible embodiment screwed to the parent body.

In addition, according to one possible embodiment, provision is made for the locking element to form a guide for the bolt head. That is to say, at least a section of the bolt head slides in the bolt longitudinal direction inside the locking element. Exact or generally positioning of the clamping bolt and thus a clamping effect of the entire clamping device that is defined as precisely as possible or generally are achieved by this guide.

In one possible embodiment, provided on the bolt head is a counter-stop, in one possible embodiment in the form of an annular web, which in the fitted position is opposite the stop provided on the locking element. The interaction of the stop with the counter-stop prevents, restricts, and/or minimizes the clamping bolt from falling out of the bore, for example if no cutting tool is arranged in the tool receptacle and the clamping bolt therefore rests loosely in the bore without an abutment. The configuration in one possible embodiment of an annular web following the bolt head can be implemented without any problems from the production point of view. As an alternative to the arrangement of the annular web on the clamping bolt, provision is made for the bolt head itself to form the counter-stop, i.e. for it to interact by means of its end face with the stop of the locking element. In this embodiment variant too, the locking element in one possible embodiment forms a guide for the bolt head.

In at least one possible embodiment of the present application, the locking element is a sleeve, in one possible embodiment a threaded sleeve, which can be detachably inserted or screwed into the bore from outside. In this case, the inner lateral surface of the in one possible embodiment cylindrical sleeve forms a guide surface for the cylindrical lateral surface of the bolt head in a simple manner. At the same time, the sleeve is in one possible embodiment simple to produce.

As an alternative thereto, the locking element is designed as an in on possible embodiment plate-shaped element, in one possible embodiment a perforated plate, which is fastened to the parent body. This plate is detachably fastened to the parent body, for example via screws.

According to one possible embodiment, the locking element does not protrude beyond the parent body, i.e. the locking element is flush with the outer side of the parent body or is arranged further on the inside within the bore in the parent body. The compact construction of the entire tool holder is thereby obtained.

With regard to the clamping functionality for clamping the cutting tool, a clamping nut is provided which is displaceable in the bore longitudinal direction and into which the clamping bolt can be screwed with its one end. At their regions facing one another, the clamping nut and the clamping head of the clamping bolt have in one possible embodiment tapered sections which act as clamping surfaces. When the clamping bolt is screwed into the clamping nut, these two tapered clamping surfaces, designed like frustums of a cone, are moved toward one another and thereby reliably hold the fastening shank, located between them, of the cutting tool in the tool receptacle.

In this case, the freedom of movement of the clamping nut in the bore longitudinal direction is in one possible embodiment restricted, such that the clamping nut is displaceable within a defined range. Provided for this purpose is in one possible embodiment a clamping pin which runs laterally through the parent body in the direction of the clamping nut.

The locking pin in this case in one possible embodiment forms a form fit. In one possible embodiment, the locking pin engages in a groove-like recess of the clamping nut. The width of the groove is in this case greater than the diameter of the locking pin, such that a relative movement is thus made possible between the groove and the locking pin. This relative movement determines in this case the free space within which the clamping nut can move in the bore longitudinal direction.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One possible embodiment of the present application is explained in more detail below with reference to the drawings, in which, in each case in schematic and partly simplified illustrations.

DESCRIPTION OF EMBODIMENT OR EMBODIMENTS

Parts having the same effect are in each case provided with the same designations in the figures.

Figure 1:
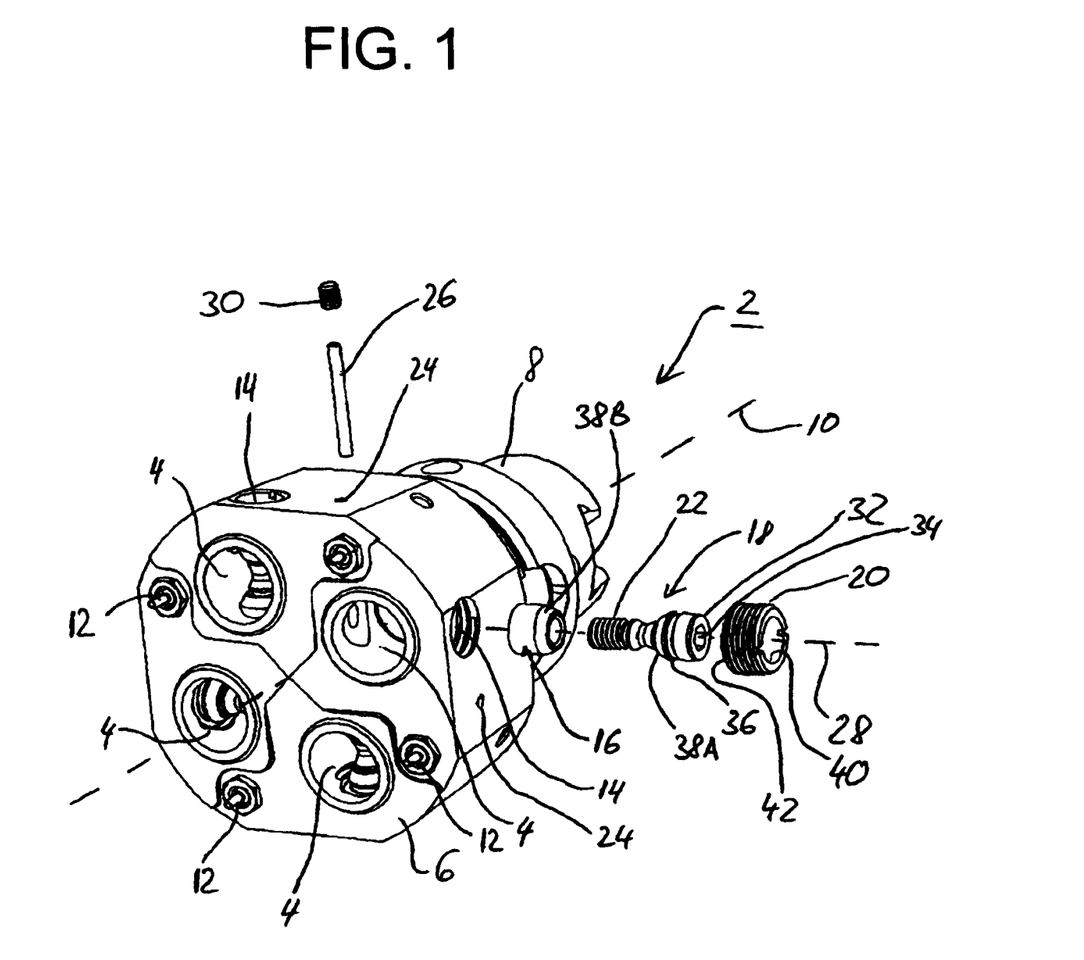
FIG. 1 shows a perspective front view of a tool holder with elements of a clamping device which are shown in the manner of an exploded illustration.
Figure 2:
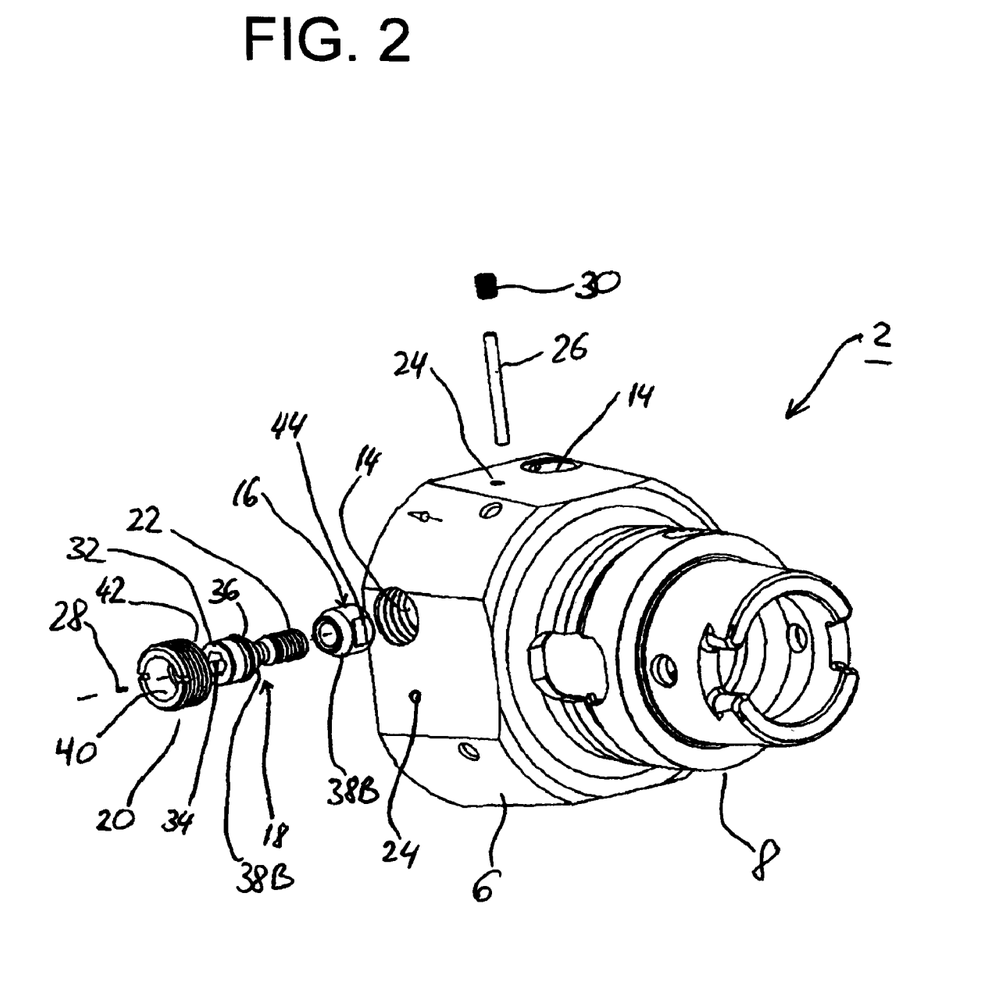
FIG. 2 shows a perspective rear view of the tool holder according to FIG. 1.

The tool holder 2 shown in FIGS. 1 and 2 serves to accommodate a total of four cutting tools (not shown in any more detail here). Said cutting tools are inserted at the end face from the front into corresponding tool receptacles 4 in the tool holder 2 and are then fastened in the tool receptacles 4 by means of a clamping device to be described in more detail below.

The tool holder 2 comprises a parent body 6 which is of one-piece monolithic design or alternatively has a plurality of tool carrying elements bearing against one another. In this case, each tool carrying element carries a respective tool receptacle 4. At its rear end, the parent body 6 has a shank 8 with which it is clamped in place in a corresponding receptacle of a machine tool. The tool holder 2 therefore extends from its front end face, in which the tool receptacles 4 are incorporated like bores, in the longitudinal direction 10 to the shank 8.

The machining of a workpiece is normally effected by means of one of the respective inserted cutting tools. In the process, the workpiece to be machined normally rotates and the cutting tool is arranged in a fixed position or performs possibly a linear movement along a predetermined path. On the whole, therefore, a turning tool is formed in which the machining is effected on the basis of a relative rotary movement between workpiece and cutting tool. The multiple tool holder 2 serves in one possible embodiment for the multistage machining of the workpiece by different cutting tools. To change the respective cutting tool in engagement with the workpiece, it is merely necessary and/or desired to rotate the tool holder 2, for example, by about ninety degrees.

At its front end face, a respective coolant outlet 12 is arranged relative to each tool receptacle 4, via which coolant outlet 12 coolant is fed to the cutting tool when required and/or desired during the machining. The parent body 6 has an essentially polygonal cross-sectional area, octagonal in one possible embodiment, and is of rotationally symmetrical design about ninety with respect to the longitudinal axis 10.

Starting from its lateral surface, respective bores 14 oriented approximately perpendicularly or virtually perpendicularly to the direction defined by the longitudinal axis 10 are incorporated relative to the individual tool receptacles 4. The bores 14 in this case each end inside the parent body 6 and thus do not form through-bores. The elements of the clamping device, namely a clamping nut 16, a clamping bolt 18 and a threaded sleeve 20 forming a locking element are inserted into each of the bores 14 from outside. For fitting, a section of the clamping bolt 18 is already normally screwed with an end bolt thread 22 into the clamping nut 16. Of especial importance is the fact that the elements of the clamping device can be inserted on one side, i.e. from a single outer side. It is therefore not necessary or may not be desired for there also to be accessibility of the tool receptacle 4 from the opposite side.

Rotationally offset by approximately ninety degrees from the bore 14, a locking pin 26 is inserted through a further bore 24 likewise from the lateral surface side of the parent body 6. Said locking pin 26 extends right into the tool receptacle 4 and interacts with the clamping nut 16 in the fitted state. In this case, the locking pin 26 limits the displaceability of the clamping nut 16 in the longitudinal direction 28 of the bore 14. The locking pin 16 is held in the parent body 6 via a headless set screw 30.

Figure 3:
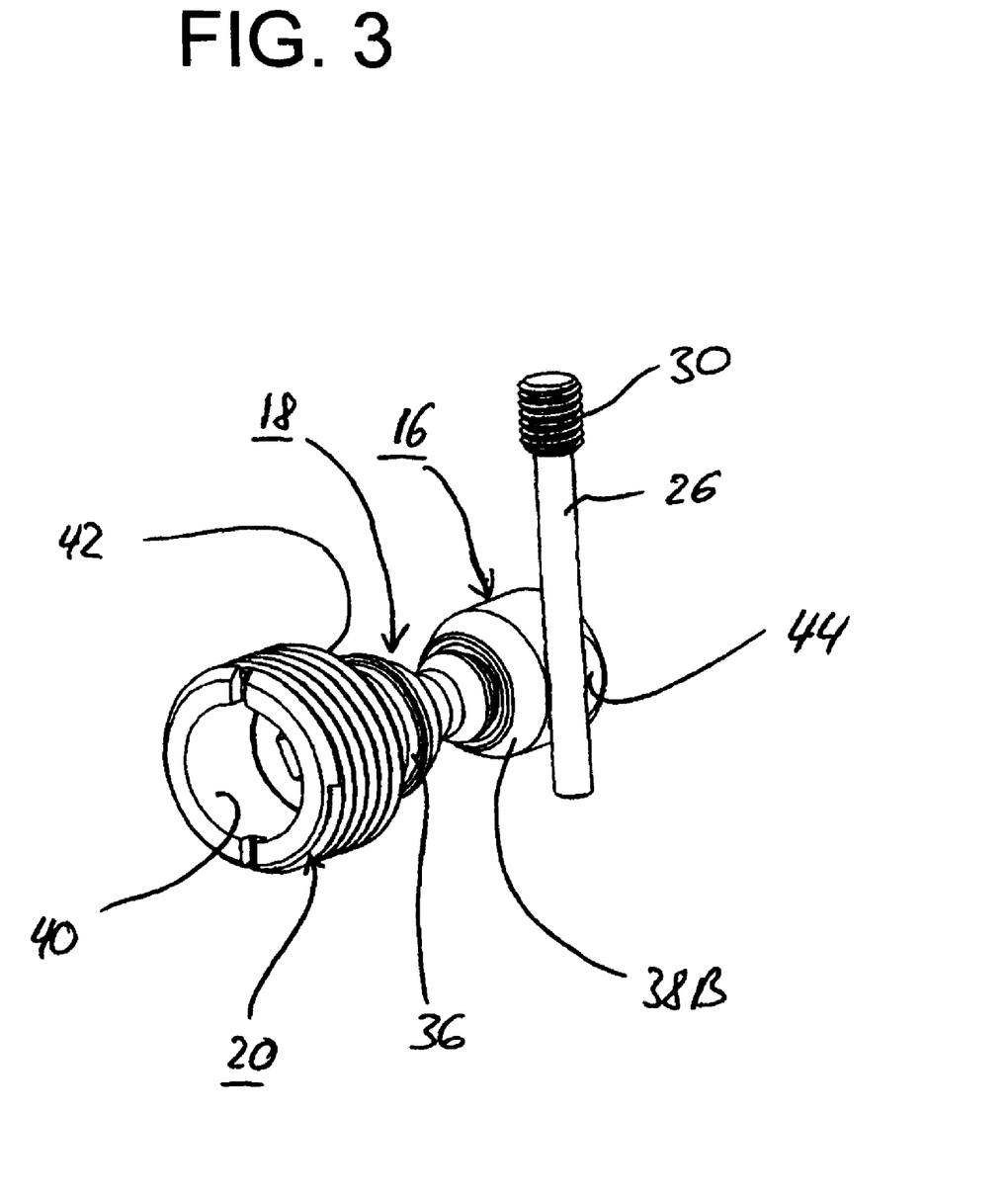
FIG. 3 shows a perspective illustration of the individual elements of the clamping device without the parent body of the tool holder in FIGS. 1 and 2.

The clamping bolt 18 has a cylindrical bolt head 32. In one possible embodiment, the cylindrical bolt head 32 has an internal polygonal receptacle 34 which serves to accommodate a setting tool, via which the clamping bolt 18 can be turned. In the bore longitudinal direction 28 in the direction toward the clamping nut 16, an annular web 36 which defines a counter-stop adjoins the cylindrical lateral surface of the bolt head 32. Said annular web is followed further by a tapered, frustoconical clamping surface 38A. Corresponding thereto, the clamping nut 16 also has such a clamping surface 38B.

In the fitted state, the threaded sleeve 20 is screwed into the bore 14 in the parent body 6, the bore 14 having a corresponding internal thread for this purpose. In the final fitted state, the threaded sleeve 20 lies completely inside the parent body 6 and therefore does not protrude. The threaded sleeve 20 is of slotted design on its outer annular side, such that it can be screwed into or out of the bore 14 via a conventional screwdriver.

With its internal diameter, the inner side of the threaded sleeve 20 is adapted to the external diameter of the bolt head 32 in the region of its outer lateral surface. That is to say, the threaded sleeve 20 accommodates the bolt head 32 at most up to the annular web 36. In the process, a slight clearance is formed between the sleeve inner side and the lateral surface of the bolt head 32. The sleeve inner side therefore constitutes a guide 40 for the bolt head 32. The front annular surface, oriented toward the bolt head 32, of the threaded sleeve 20 constitutes a stop 42, with which the annular web 36 interacts as counter-stop. The stop 42 and the annular web 36 form, in their interaction, a captive locking means for the clamping bolt 18 and the clamping nut 16.

The threaded sleeve 20 therefore serves different purposes. First, the threaded sleeve 20, via the stop 42, virtually ensures that the clamping bolt or clamping screw 18 cannot become dislodged or inadvertently removed out of the tool holder body 6 through the bore 14. Second, the threaded sleeve 20 acts as a guide to position the clamping bolt 18 in a desired position in the bore 14. Third, the threaded sleeve 20 retains the clamping bolt 18 in position such that the clamping bolt 18 does not move substantially in a direction perpendicular to the longitudinal direction or axis 28 of the clamping bolt 18, such as during a cutting or machining operation. Such movement of the clamping bolt 18 would be undesirable as the movement could possibly permit movement of the cutting device secured by the clamping bolt 18, especially during a cutting operation, which would lead to imprecise or incorrect cutting of a workpiece.

In other words and in accordance with at least one possible embodiment with the present application, the fitted state of the clamping device may occur when the elements of the clamping device are inserted into the parent body 6 of the tool holder 2 and screwed into engagement with the tool holder 2. For example, the clamping device is in a fitted state when the locking pin 26 interacts with the clamping nut 16 and also when the end bolt thread 22 is fully engaged with the clamping nut 16 and the stop 42 of the threaded sleeve 20 and the annular web 36 of the clamping bolt 18 form a captive locking means.

As can be seen in one possible embodiment from FIGS. 2 and 3, the locking pin 26 engages in a groove-like recess 44 in the fitted state. The width of the recess 44, i.e. its extent in the bore longitudinal direction 28, is in this case greater than the diameter of the locking pin 26. The clamping nut 16 can therefore be displaced back and forth in the bore longitudinal direction 28 relative to the fixed locking pin 26 within a defined range. The marginal sides of the recess 44 form stops which limit the freedom of movement of the clamping nut 16.

During use of the tool holder 2, the elements of the clamping device, namely the clamping nut 16, the clamping bolt 18, and the threaded sleeve 20 on the one hand and furthermore the locking pin 26 and the headless set screw 30 on the other hand, are already arranged prefitted in the tool holder 2. To insert the cutting tool, said cutting tool, with its suitably provided fastening shank in front, is inserted into the tool receptacle 4. The clamping bolt 18 is screwed further into the clamping nut 16 by tightening said clamping bolt 18, such that the two gripping surfaces 38A, 38B are moved toward one another and the fastening shank is held in both a gripping and form-fitting manner.

Figure 4:
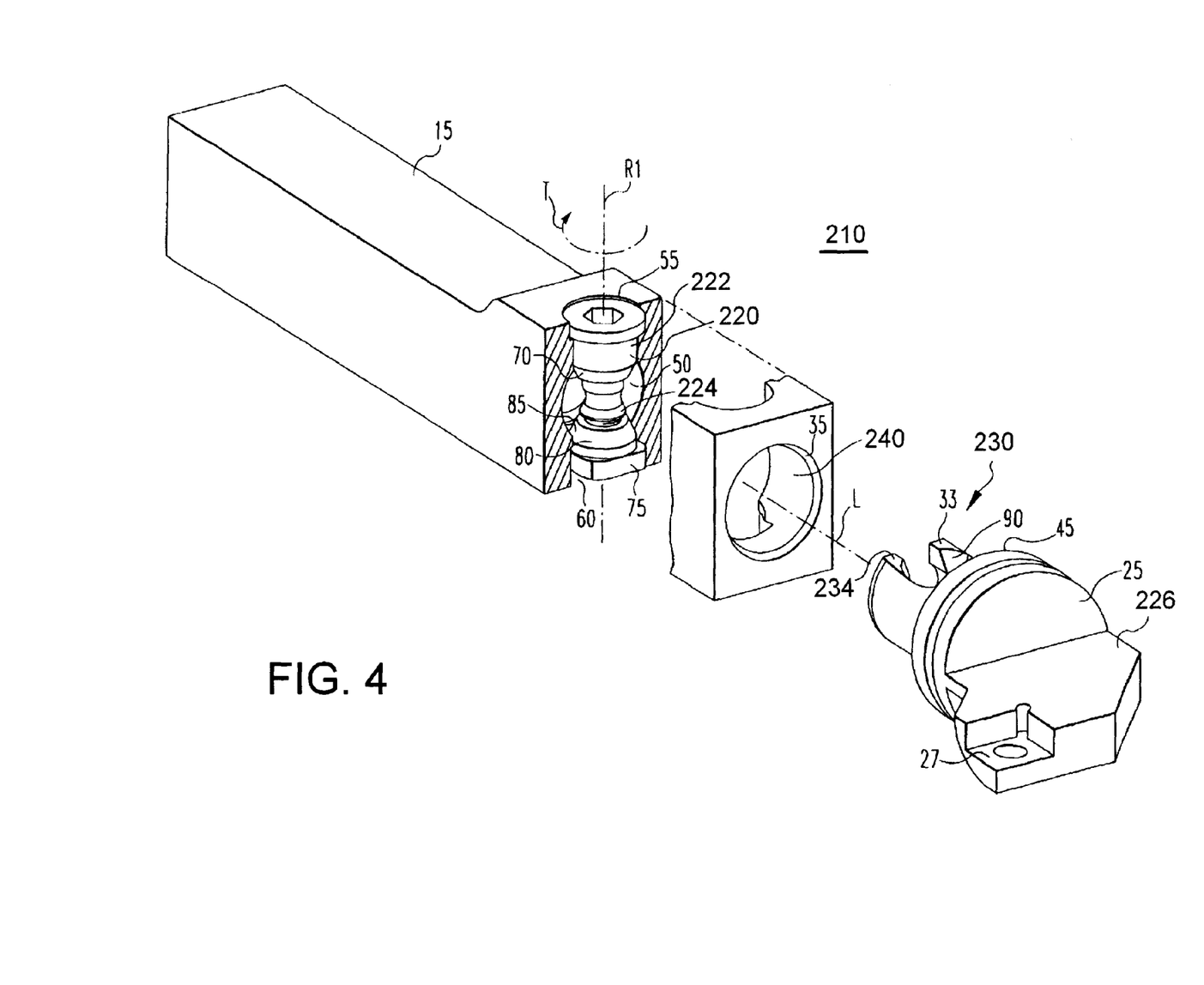
FIG. 4 is a perspective view of a toolholder assembly in accordance with the present application.

For the tool change, the clamping bolt 18 needs to be or should be slackened, such that the gripping surfaces 38A, 38B are moved away from one another in the opposite direction. In the process, the clamping bolt 18 can be unscrewed until it comes to bear with its annular web 36 against the stop 42 of the threaded sleeve 20. In this released position, too, a section of the bolt thread 22 remains in the clamping nut 16. The configuration of the fastening shank and of the basic clamping mechanism can be seen in particular from DE 600 23 191 T2 and its corresponding U.S. Pat. No. 6,415,696 B1. FIGS. 1, 2, and 4 of U.S. Pat. No. 6,415,696 B1 and their following corresponding descriptions have been included in the present application as FIGS. 4, 5, and 6 respectively. Some of the reference numerals have been renumbered to avoid overlap with the reference numerals in FIGS. 1-3 of the present application.

Figure 5:
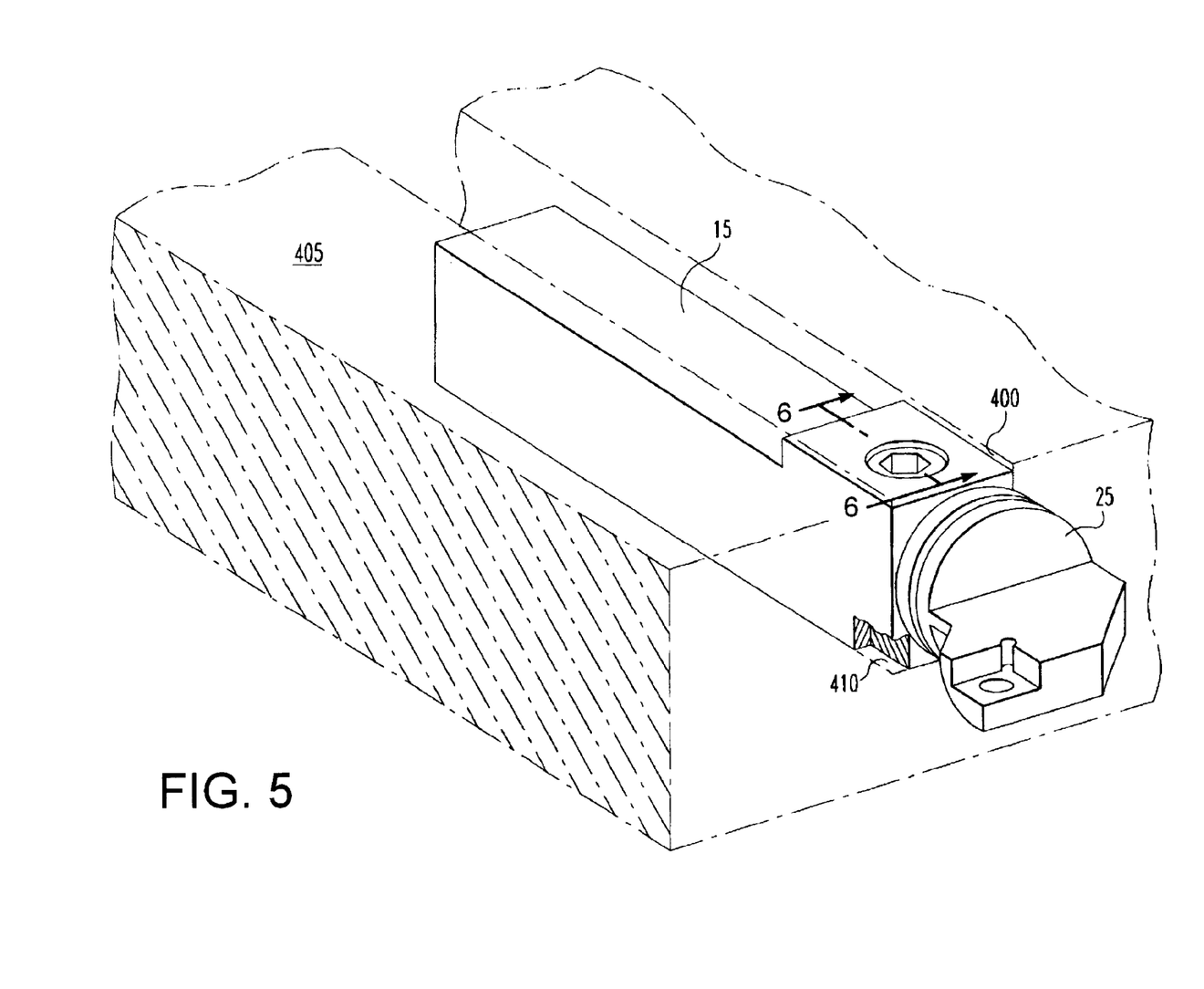
FIG. 5 is an assembled perspective view of a toolholder assembly in accordance with the present application mounted within a slot on a machine tool.

FIGS. 4 and 5 illustrate perspective views of the present application in an exploded arrangement and an assembled arrangement respectively. In general, as seen in FIG. 4, the apparatus 210 is made up of a tool support member 15, an actuating bolt 220, and a toolholder 25 having a shank 230, which may be tubular with a conical shape. However, the present application is directed at securing the shank 230 within the bore 240 of the tool support member 15 and, therefore, the shank 230 and the bore 240 may be any number of different shapes, including cylindrical, square, rectangular, triangular and trochoidal, sufficient to accommodate the actuating bolt 220 described herein. Furthermore, the shank 230 may have an interference fit within the bore 240.

The toolholder 25 may have a support portion 226 with a pocket 27 for receiving a cutting insert (not shown) therein. However, the toolholder 25 is presented for illustrative purposes and, as will be discussed, the shank 230 of the present application may be used with any of a variety of configurations attached to the shank. Therefore, the term "toolholder" used herein should encompass any configurations secured to the tool support member 15 through the shank 230.

The tool support member 15 has a forwardly facing surface 35 and a bore 240 along a longitudinal axis L. The surface 35 may be mateable with an opposing rearward abutment surface 45 on the toolholder 25 and these surfaces may be, among other shapes, conical or planar, to matingly contact one another. The bore 240 extends rearwardly from the forwardly facing surface 35 for receiving the tubular toolholder shank 230 of the toolholder 25.

The actuating bolt 220 is positioned in the tool support member 15 along a radial axis R1, which is radial to the longitudinal axis L, for locking the toolholder 25 into the tool support member 15 or for ejecting the toolholder 25 from the tool support member 15. The actuating bolt 220 is positioned within a passageway 50 extending through the tool support member 15 along axis R1, thereby defining a first aperture 55 and a second aperture 60 within the tool support member 15 wherein the second aperture 60 is directly opposed or generally opposed to the first aperture 55.

As further illustrated in FIG. 4, the actuating bolt 220 has a first end 222 and a second end 224. An actuating nut 75 is rotatably fixed within the tool support member 15 and threadably secured to the second end 224 of the actuating bolt 220. The actuating nut 75 has a nut locking segment 80 with a nut locking surface 85. Rotation of the actuating bolt 220 in a locking direction, indicated for example by arrow T in FIG. 4, causes the actuating nut 75 to be drawn toward the bolt first end 222 thereby drawing together the nut locking surface 85 and the bolt locking surface 70 to engage lockable surfaces on the toolholder. Instead of rotating the bolt, the bolt may be rotationally fixed and the actuating nut may be rotated using a suitable nut designed to permit such rotation.

The shank 230, comprises a first toolholder lockable surface 90. To promote the removal of the toolholder 15 from the tool support member 15, the toolholder shank 230 has a flat surface 33 on the top of the shank 230.

FIG. 5 illustrates the toolholder 25 secured within the tool support member 15. As will be later discussed, the toolholder support member 15 may be secured within a slot 400 on a machine tool 405. When the tool support member 15 is mounted with such a slot 400, the actuating nut is physically blocked by the bottom surface 410 of the slot 400 thereby preventing, restricting, and/or minimizing axial motion of the actuating nut (not shown) beyond the boundary of the tool support member 15.

Figure 6:
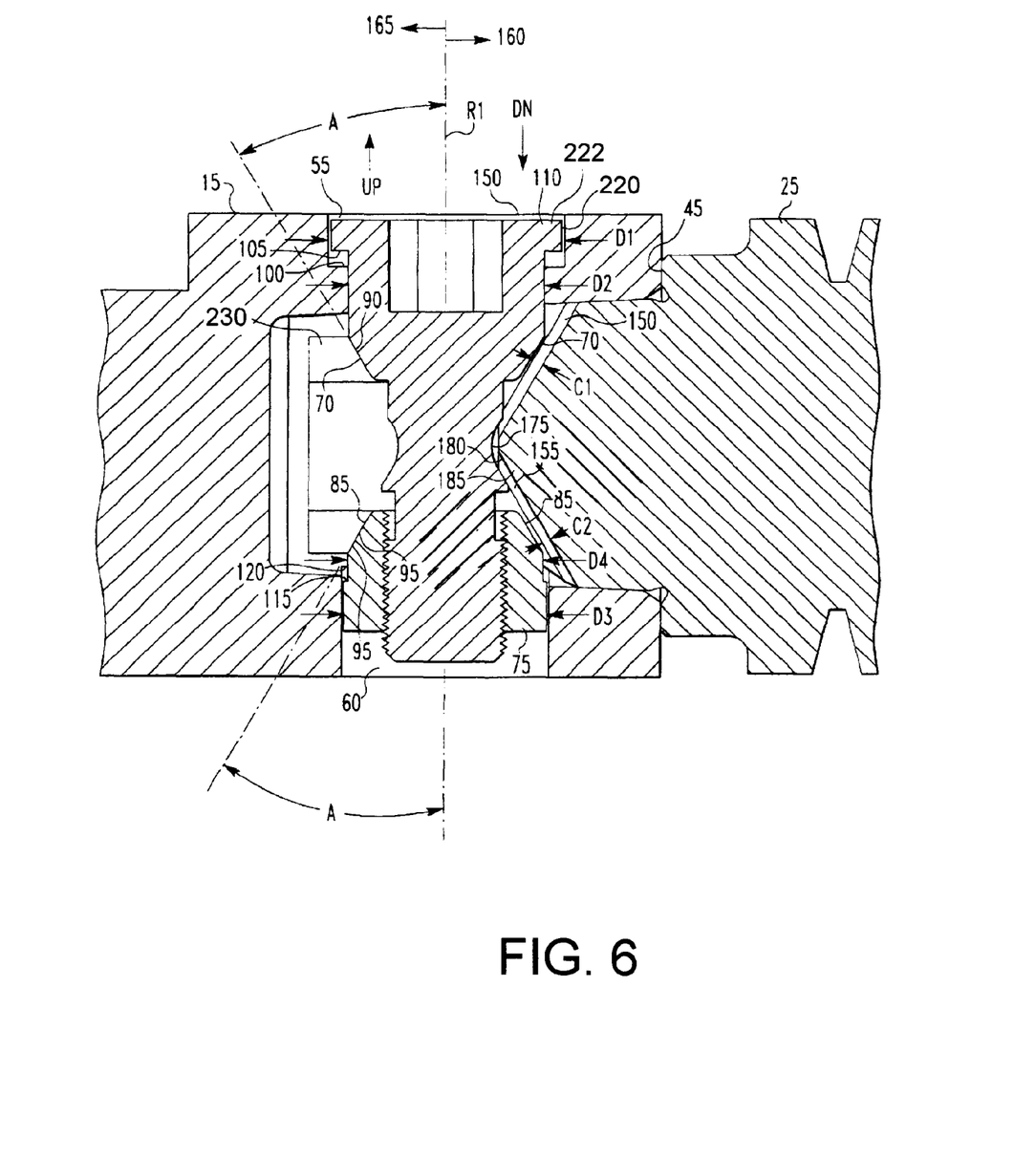
FIG. 6 is a section view along arrows "6-6" in FIG. 5 illustrating the apparatus in the locked position.

FIG. 6 illustrates the actuating bolt 220 and the actuating nut 75 in a locked position to secure the toolholder 25 within the tool support member 15. The first aperture 55 and the second aperture 60 of the support member 15 provide lateral support to the actuating bolt 220 and actuating nut 75, respectively, and allow limited movement of the actuating nut 75 and actuating bolt 220 along the radial axis R1. It should be noted that neither the actuating bolt 220 nor the actuating nut 75 are threadably secured to the first aperture 55 or the second aperture 60 of the tool support member 15. Because of this, when the shank 230 of the toolholder 25 is removed from the tool support member 15, which may occur when the apparatus is in the unlocked state, then the actuating bolt 220 and the actuating nut 75 are free to move along the radial axis R1. By permitting this movement, when the toolholder 25 is positioned within the tool support member 15 and the actuating bolt 220 is rotated in the locking direction, the actuating nut 75 is drawn toward the first end 222 of the actuating bolt 220 and lockable surfaces 90, 95 of the shank 230 are engaged with equal forces.

Since the bolt 220 and the nut 75 are free to slide in the apertures 55, 60 when the toolholder 25 is not inserted in the tool support member 15 then, as a practical matter, the bolt 220 should be prevented, restricted, or minimized from sliding out from the tool support member 15. As illustrated in FIG. 6, the first aperture 55 has a first aperture flange diameter D1 and a smaller first aperture bolt diameter D2 to define a shoulder 100 which engages the shoulder 105 of a flange 110 on the first end 222 of the actuating bolt 220 thereby limiting, restricting, and/or minimizing the downward movement indicated by arrow DN along axis R1 of the actuating bolt 220 and the actuating nut 65. In a similar fashion, the second aperture 60 has a second aperture nut width D3 and a width D4 which define a shoulder 115 to engage a corresponding shoulder 120 of the actuating nut 75 thereby limiting, restricting, and/or minimizing the upward movement indicated by arrow UP along axis R1 of the actuating bolt 220 and the actuating nut 75.

To advance the actuating nut 75 upon the actuating bolt 220 it is necessary or may be desired when the actuating bolt 220 is rotated to rotationally restrain, restrict, or minimize the actuating nut 75. In accordance with at least one possible embodiment, as illustrated in FIG. 4, the actuating nut 75 may have a square shape. Additionally, the nut 75 may have any other non-circular shape or other polygonal shape. The second aperture 60 provides a cavity which conforms to the shape of the actuating nut 75 thereby rotationally fixing the actuating nut 75 within the second aperture 60. In this manner, when the actuating bolt 220 is rotated, the rotationally fixed actuating nut 75 will move linearly along the radial axis R1.

In FIG. 6, which shows the apparatus in the locked position, when the actuating bolt 220 is tightened, the locking surface 70 of the actuating bolt 220 is urged against the first toolholder lockable surface 90 and the locking surface 85 of the actuating nut 75 is urged against the second toolholder lockable surface 95 to urge the shank 230 within the tool support member 15.

For convenience, reference will be made to a forward half 160 and a rearward half 165 of the actuating bolt 220, as illustrated in FIG. 6.

All of the forces or substantially all of the forces or most of the forces imposed by the actuating bolt 220 and the actuating nut 75 upon the shank 230 during the locking operation are applied rearwardly of radial axis R1. At the forward half 160 of the actuating bolt 220, there is a clearance C1 between the locking surface 70 of the actuating bolt 220 and the perforation 150 and, furthermore, there is a clearance C2 between the locking surface 85 of the actuating nut 75 and the perforation 155. In this manner, the forces opposed by the actuating bolt 220 and the actuating nut 75 in the locked position urge the shank 230 toward the rearward half 165 of the actuating bolt 220.

It should be noted in FIG. 6, when the apparatus is in the locked position, the releasing surface 175 is positioned adjacent to a protruding segment 180 of the toolholder 25. The protruding segment 180 has a releasable surface 185. However, there is no contact between these two parts.

To promote the removal of the toolholder 15 from the tool support member 15, the toolholder shank 230, as illustrated in FIG. 4, has a pair of flat surfaces 33, 234 on the top of the shank 230 and a similar pair of flat surfaces (not shown) on the bottom of the shank 230. These flats provide clearance and allow less distance between the bolt 220 and the nut 75 for removal of the toolholder 25 from the tool support member 15. This also allows for or permits a more compact design since the bolt 220 and nut 75 may operate with a smaller distance between them.

It is not uncommon for the shank 230 of the toolholder 25 to remain frictionally engaged within the tool support member 15 even after the positive locking provided by the actuating bolt 220 and actuating nut 75 has been relieved. Under such circumstances, it is necessary or may be desired to positively displace the toolholder 25 toward the forward half 160 of the actuating bolt 220 to release the toolholder 25 from the tool support member 15.

As illustrated in FIG. 5, it is common or may be common for such a tool support member 15, to be mounted within the slot 400 (in phantom) on a machine tool 405 (in phantom). The tool support member 15 is secured or may be secured within the slot 400 using any of a number of techniques. When the tool support member 15 is mounted with such a slot 400, the actuating nut is physically blocked by the bottom surface 410 of the slot 400 thereby preventing, restricting, or minimizing axial motion of the actuating nut (not shown) beyond the boundary of the tool support member 15.

Directing attention to FIG. 6, the locking surface 70 of the actuating bolt 220 forms an angle A with the radial axis R1. The range of the angle A may be between ten to sixty degrees, with an angle of thirty degrees in at least one possible embodiment. The locking surface 85 of the actuating nut 75 forms a similar angle A with the radial axis R1. Likewise, the first toolholder lockable surface 90 and the second toolholder lockable surface 95, illustrated in FIG. 6, form the same angle A with the radial axis R1.

On the whole, an extremely compact tool holder 2 which has a plurality of tool receptacles 4 for accommodating cutting tools is made possible by the configuration described here. The compact configuration is in this case essentially achieved by virtue of the fact that the tool receptacles 4 are integrated directly in the parent body 6 and do not form mounted separate units. This is substantially achieved by virtue of the fact that the elements of the clamping device are in each case inserted from one outer side of the lateral surface of the parent body 6. Therefore no through-bores need to be provided here. In order to achieve this, the threaded sleeve 20 is designed as a captive locking means for the clamping bolt 18 and the clamping nut 16.

To make it possible for a tool holder 2 that has a number of tool receptacles 4 provided in a base body 6 to be structured in a compact manner, it is provided that a tensioning bolt 18 is led laterally through a bore 14 in the base body 6 to the tool receptacle 4. The tensioning bolt 18 has at its outer end a bolt head 32 which can be actuated by means of a setting tool and is secured by a securing element 20 which is attached to the base body 6 in the region of the bore 14 and forms a stop 42 for the bolt head 32. This configuration allows the entire tensioning device to be mounted in a space-saving way from just one side. The securing element 20 achieves the effect of preventing the elements of the tensioning device from being lost.

One feature or aspect of an embodiment is believed at the time of the filing of this patent application to possibly reside broadly in a tool holder 2 having a number of tool receptacles 4 which are provided in a parent body 6 and into which a respective cutting tool can be inserted with a fastening shank and can be clamped in the tool receptacle 4 via a clamping device which comprises a clamping bolt 18 which extends laterally through a bore 14 in the parent body 6 up to the tool receptacle 4 and has at its outer end a bolt head 32 which can be actuated via a setting tool and is locked by a locking element 20 which is attached to the parent body 6 in the region of the bore 14 and forms a stop 42 for the bolt head 32.

Another feature or aspect of an embodiment is believed at the time of the filing of this patent application to possibly reside broadly in the tool holder 2, wherein the locking element 20 is designed as an insert.

Yet another feature or aspect of an embodiment is believed at the time of the filing of this patent application to possibly reside broadly in the tool holder 2, wherein the locking element 20 is detachably fastened to the parent body 6.

Still another feature or aspect of an embodiment is believed at the time of the filing of this patent application to possibly reside broadly in the tool holder 2, wherein the locking element 20 forms a guide 40 for the bolt head 32.

A further feature or aspect of an embodiment is believed at the time of the filing of this patent application to possibly reside broadly in the tool holder 2, wherein a counter-stop 36 to the stop 42 provided on the locking element 20 is formed such as to adjoin the bolt head 32.

Another feature or aspect of an embodiment is believed at the time of the filing of this patent application to possibly reside broadly in the tool holder 2, wherein the locking element 20 is a sleeve, in one possible embodiment a threaded sleeve, which can be detachably inserted into the bore 14 from outside.

Yet another feature or aspect of an embodiment is believed at the time of the filing of this patent application to possibly reside broadly in the tool holder 2, wherein the locking element 20 does not protrude beyond the parent body 6.

Still another feature or aspect of an embodiment is believed at the time of the filing of this patent application to possibly reside broadly in the tool holder 2, wherein a clamping nut 16 displaceable in the bore longitudinal direction 28 is provided in the parent body 6, the clamping bolt 18 being screwed into said clamping nut 16.

A further feature or aspect of an embodiment is believed at the time of the filing of this patent application to possibly reside broadly in the tool holder 2, wherein a locking pin 26 is provided which runs laterally through the parent body 6 in the direction of the clamping nut 16 and limits its movement in the bore longitudinal direction 28.

Another feature or aspect of an embodiment is believed at the time of the filing of this patent application to possibly reside broadly in the tool holder 2, wherein the clamping nut 16 has a groove-like recess 44, in which the locking pin 26 engages.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents, patent applications or patent publications, are hereby incorporated by reference as if set forth in their entirety herein: DE 600 23 191 T2, having the following English translation of the German title "TOOLHOLDER ASSEMBLY," published on Jul. 6, 2006. In addition, U.S. Pat. No. 6,415,696 B1, issued to inventors Erickson et al. on Jul. 9, 2002, which patent corresponds to German patent publication DE 600 23 191 T2, is incorporated by reference as if set forth in its entirety herein.

All of the patents, patent applications or patent publications, which were cited in the International Search Report dated Mar. 6, 2008, and/or cited elsewhere are hereby incorporated by reference as if set forth in their entirety herein as follows: US 2006/104728, having the title "TOOLHOLDER," published on May 18, 2006; DE 42 21 735, having the following English translation of the German title "SIDE OPERATED HOLDING FIXTURE FOR TOOL SUPPORTS ON MACHINES—HAS INTERNAL CLAMPING JAWS OPERATED MANUALLY FROM SIDE OF HOLLOW SHAFT INSTEAD OF SPREADER BAR IN CENTRAL BORE," published on Mar. 4, 1993; DE 86 33 959, having the following German title "VORRICHTUNG ZUR VERBINDUNG ZWEIER MASCHINENTEILE, INSBESONDERE ZWEIER WERKZEUGTEILE VON WERKZEUGMASCHINEN," published on Apr. 14, 1988; and U.S. Pat. No. 6,543,318, having the title "LOCKING ASSEMBLY," published on Apr. 8, 2003.

The patents, patent applications, and patent publications listed above in the preceding two paragraphs are herein incorporated by reference as if set forth in their entirety. The purpose of incorporating U.S. patents, non-U.S. patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 052 051.3, filed on Nov. 4, 2006, having inventor Jürgen PUSCHMANN-FRENKEN, and DE-OS 10 2006 052 051.3 and 10 2006 052 051.3, and International Application No. PCT/EP2007/008346, filed on Sep. 26, 2007, having WIPO Publication No. WO 2008/052623 and inventor Jürgen PUSCHMANN-FRENKEN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the foreign equivalent patent applications, that is, International Application No. PCT/EP2007/008346 and German Patent Application 10 2006 052 051.3, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/008346 and DE 10 2006 052 051.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A cutting arrangement for cutting a workpiece comprising:

a tool holder comprising a shank configured to be inserted into a machine and a body connected to said shank;

said tool holder having a central longitudinal axis;

said tool holder body having a substantially planar end face disposed transverse to the central longitudinal axis of said tool holder, and side faces extending from and transverse to said end face;

said tool holder body comprising a plurality of tool receptacles, each being configured to receive a fastening shank of a cutting tool therein;

a plurality of clamping devices, each being configured to retain a fastening shank of a cutting tool in a corresponding one of said tool receptacles;

each of said tool receptacles comprising:

a first bore hole being disposed to open in said end face and being configured to permit a fastening shank of a cutting tool to be inserted there through; and a second bore hole being disposed to open in one of said side faces and being configured to permit a corresponding one of said clamping devices to be inserted there through; and each of said clamping devices comprising:

a clamping screw being configured and disposed to extend transverse to the central longitudinal axis of said tool holder in a corresponding one of said second bore holes;

a threaded locking ring being screwed into a corresponding one of said second bore holes and being disposed immediately adjacent the second bore hole opening in a corresponding one of said side faces;

said clamping screw comprising a screw head being configured to receive a portion of a turning tool therein to permit rotational adjustment of the position of said clamping screw;

said screw head being disposed inside said locking ring, wherein the diameter of said screw head is substantially similar to the inner diameter of said locking ring to align said clamping screw in its corresponding second bore hole and to minimize movement of said clamping screw in a direction transverse to the rotational axis of said clamping screw;

said clamping screw comprising a projecting shoulder portion disposed adjacent said screw head; and said locking ring comprising an annular end face being configured and disposed to engage said projecting shoulder portion to retain said clamping screw in its corresponding tool receptacle.

2. The cutting arrangement according to claim 1, wherein said locking element does not protrude out its corresponding second bore hole beyond its corresponding side surface of said tool holder body.

3. The cutting arrangement according to claim 2, wherein:

said clamping device comprises a clamping nut disposed in its corresponding tool receptacle and configured to be displaced toward and away from its corresponding second bore hole opening; and said clamping screw is screwed into said clamping nut, and are together configured and disposed to clamp a portion of a fastening shank of a cutting tool.

4. The cutting arrangement according to claim 3, wherein:

said tool holder body comprises a plurality of third bore holes disposed to open in one of said side faces and to run substantially transverse to the rotational axis of a corresponding one of said clamping screws;

said cutting arrangement comprises a plurality of locking pins, each of which is inserted into a corresponding one of said third bore holes; and each of said locking pins is configured and disposed to project into a corresponding one of said tool receptacles and engage a corresponding one of said clamping nuts to limit movement of the corresponding clamping nut along the direction of the rotational axis of a corresponding one of said clamping screws.

5. The cutting arrangement according to claim 4, wherein each of said clamping nuts comprises a groove-like recess into which a corresponding one of said locking pins engages.

6. The cutting arrangement according to claim 1, wherein:

said clamping device comprises a clamping nut disposed in its corresponding tool receptacle and configured to be displaced toward and away from its corresponding second bore hole opening;

said clamping screw is screwed into said clamping nut, and are together configured and disposed to clamp a portion of a fastening shank of a cutting tool;

said tool holder body comprises a plurality of third bore holes disposed to open in one of said side faces and to run substantially transverse to the rotational axis of a corresponding one of said clamping screws;

said cutting arrangement comprises a plurality of locking pins, each of which is inserted into a corresponding one of said third bore holes;

each of said locking pins is configured and disposed to project into a corresponding one of said tool receptacles and engage a corresponding one of said clamping nuts to limit movement of the corresponding clamping nut along the direction of the rotational axis of a corresponding one of said clamping screws;

each of said clamping nuts comprises a groove-like recess into which a corresponding one of said locking pins engages.

7. A cutting arrangement for cutting a workpiece comprising:

a tool holder comprising a shank configured to be inserted into a machine and a body connected to said shank;

said tool holder having a central longitudinal axis;

said tool holder body having an end face disposed transverse to the central longitudinal axis of said tool holder, and side faces extending from and transverse to said end face;

said tool holder body comprising a plurality of tool receptacles, each being configured to receive a shank of a cutting tool therein;

a plurality of clamping devices, each being configured to retain a shank of a cutting tool in a corresponding one of said tool receptacles;

each of said tool receptacles comprising:

a first bore hole being disposed to open in said end face and being configured to permit a fastening shank of a cutting tool to be inserted there through; and a second bore hole being disposed to open in one of said side faces and being configured to permit a corresponding one of said clamping devices to be inserted there through; and each of said clamping devices comprising:

a clamping screw being configured and disposed to extend transverse to the central longitudinal axis of said tool holder in a corresponding one of said second bore holes;

a locking element being disposed in a corresponding one of said second bore holes;

said clamping screw comprising a screw head being disposed at least partially inside said locking element; and said locking element comprising an end face being configured and disposed to engage a portion of said clamping screw to retain said clamping screw in its corresponding tool receptacle.

8. The cutting arrangement according to claim 7, wherein said locking element comprises an insert.

9. The cutting arrangement according to claim 8, wherein said locking element is detachably fastened to said tool holder body.

10. The cutting arrangement according to claim 9, wherein said screw head is disposed inside said locking ring, and wherein the diameter of said screw head is substantially similar to the inner diameter of said locking ring to align said clamping screw in its corresponding second bore hole and to minimize movement of said clamping screw in a direction transverse to the rotational axis of said clamping screw.

11. The cutting arrangement according to claim 10, wherein:

said clamping screw comprises a projecting shoulder portion disposed adjacent said screw head; and said end face of said locking element is configured and disposed to engage said projecting shoulder portion to retain said clamping screw in its corresponding tool receptacle.

12. The cutting arrangement according to claim 11, wherein said locking element comprises a threaded sleeve screwed into its corresponding second bore hole from outside.

13. The cutting arrangement according to claim 12, wherein said locking element does not protrude out its corresponding second bore hole beyond its corresponding side surface of said tool holder body.

14. The cutting arrangement according to claim 13, wherein:

said clamping device comprises a clamping nut disposed in its corresponding tool receptacle and configured to be displaced toward and away from its corresponding second bore hole opening; and said clamping screw is screwed into said clamping nut, and are together configured and disposed to clamp a portion of a fastening shank of a cutting tool.

15. The cutting arrangement according to claim 14, wherein:

said tool holder body comprises a plurality of third bore holes disposed to open in one of said side faces and to run substantially transverse to the rotational axis of a corresponding one of said clamping screws;

said cutting arrangement comprises a plurality of locking pins, each of which is inserted into a corresponding one of said third bore holes; and each of said locking pins is configured and disposed to project into a corresponding one of said tool receptacles and engage a corresponding one of said clamping nuts to limit movement of the corresponding clamping nut along the direction of the rotational axis of a corresponding one of said clamping screws.

16. The cutting arrangement according to claim 15, wherein each of said clamping nuts comprises a groove-like recess into which a corresponding one of said locking pins engages.

17. The cutting arrangement according to claim 7, wherein:

said clamping device comprises a clamping nut disposed in its corresponding tool receptacle and configured to be displaced toward and away from its corresponding second bore hole opening; and said clamping screw is screwed into said clamping nut, and are together configured and disposed to clamp a portion of a fastening shank of a cutting tool.

18. The cutting arrangement according to claim 17, wherein:

said tool holder body comprises a plurality of third bore holes disposed to open in one of said side faces and to run substantially transverse to the rotational axis of a corresponding one of said clamping screws;

said cutting arrangement comprises a plurality of locking pins, each of which is inserted into a corresponding one of said third bore holes; and each of said locking pins is configured and disposed to project into a corresponding one of said tool receptacles and engage a corresponding one of said clamping nuts to limit movement of the corresponding clamping nut along the direction of the rotational axis of a corresponding one of said clamping screws.

19. The cutting arrangement according to claim 18, wherein each of said clamping nuts comprises a groove-like recess into which a corresponding one of said locking pins engages.

20. The cutting arrangement according to claim 19, wherein said locking element does not protrude out its corresponding second bore hole beyond its corresponding side surface of said tool holder body.

\* \* \* \* \*